US008917375B2

(12) United States Patent
Woida-O'Brien

(10) Patent No.: US 8,917,375 B2
(45) Date of Patent: Dec. 23, 2014

(54) GREY-SCALE HOLOGRAPHIC STRUCTURE AND SYSTEM FOR GENERATING A MILLIMETER-WAVE COLLIMATED WAVEFRONT IN A COMPACT RANGE

(71) Applicant: Raytheon Company, Waltham, MA (US)

(72) Inventor: Rigel Quinn Woida-O'Brien, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/305,729

(22) Filed: Jun. 16, 2014

(65) Prior Publication Data

US 2014/0293387 A1 Oct. 2, 2014

Related U.S. Application Data

(62) Division of application No. 13/663,833, filed on Oct. 30, 2012, now Pat. No. 8,755,023.

(51) Int. Cl.
*G03H 5/00* (2006.01)

(52) U.S. Cl.
CPC ........................................ *G03H 5/00* (2013.01)
USPC ............................ 349/193; 349/196; 349/197

(58) Field of Classification Search
USPC .......................................... 349/193, 196, 197
See application file for complete search history.

(56) References Cited

U.S. PATENT DOCUMENTS

| 6,954,252 B1 | 10/2005 | Crossland et al. |
|---|---|---|
| 8,755,023 B2 | 6/2014 | Woida-O'Brien |
| 2005/0259914 A1* | 11/2005 | Padgett et al. ................. 385/16 |
| 2011/0122467 A1* | 5/2011 | Futterer et al. .................... 359/9 |
| 2014/0117260 A1 | 5/2014 | Woida-o'Brien |

OTHER PUBLICATIONS

"U.S. Appl. No. 13/663,833, Notice of Allowance mailed Feb. 4, 2014", 8 pgs.
"U.S. Appl. No. 13/663,833, Response filed Dec. 26, 2013 to Restriction Requirement mailed Nov. 26, 2013", 7 pgs.
"U.S. Appl. No. 13/663,833, Restriction Requirement mailed Nov. 26, 2013", 4 pgs.

* cited by examiner

*Primary Examiner* — Kiet T Nguyen
(74) *Attorney, Agent, or Firm* — Schwegman Lundberg & Woessner, P.A.

(57) ABSTRACT

Embodiments of a grey-scale holographic structure and system for generating a collimated wavefront in a compact range are generally described herein. In some embodiments, the grey-scale holographic structure comprising millimeter-wave transmissive material having a surface arranged to provide differing amounts of phase-delay to an incident millimeter-wave wavefront as the incident wavefront passes through the material. The grey-scale holographic structure may comprises a plurality of layers (N) to provide a phase total delay of lambda which results from a series tuned layers, each having a thickness of a wavelength/N. Each layer provides a predetermined amount of phase delay allowing the structure to operate as a phase-delay hologram.

7 Claims, 4 Drawing Sheets

GREY-SCALE HOLOGRAPHIC STRUCTURE AND SYSTEM FOR GENERATING A MILLIMETER-WAVE COLLIMATED WAVEFRONT IN A COMPACT RANGE

CLAIM OF PRIORITY

This patent application is a divisional of and claims the benefit of priority to U.S. patent application Ser. No. 13/663,833 entitled "GREY-SCALE HOLOGRAPHIC STRUCTURE AND SYSTEM FOR GENERATING A MILLIMETER-WAVE COLLIMATED WAVEFRONT IN A COMPACT RANGE" filed Oct. 30, 2012, the entire contents of which are hereby incorporated in its entirety.

GOVERNMENT RIGHTS

This invention was not made with United States Government support. The United States Government does not have certain rights in this invention.

TECHNICAL FIELD

Some embodiments relate to millimeter-wave holography. Some embodiments relate to holographic optical elements (HOE) including computer-generated holograms (CGHs) and holographic structures. Some embodiments relate to phase-delay holograms and holographic structures for use with millimeter waves. Some embodiments relate RF Ka band and millimeter-wave band calibration and testing. Some embodiments relate to tri-mode seeker simulators.

BACKGROUND

One issue with using millimeter waves or frequencies in the RF Ka band is the generation of a collimated or flat-field wavefront. Many millimeter-wave and RF Ka band sources generate curved wavefronts that need to be converted to a collimated wavefront for many situations. Conventional techniques for generating a collimated wavefront are either very expensive, require a significant amount of space and/or are inefficient.

Thus, there are general needs for structures and systems for generating a collimated RF Ka band or millimeter-wave wavefront in a compact range. There are also general needs for structures and systems for generating a collimated RF Ka band or millimeter-wave wavefront that are less expensive and more efficient than conventional techniques.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
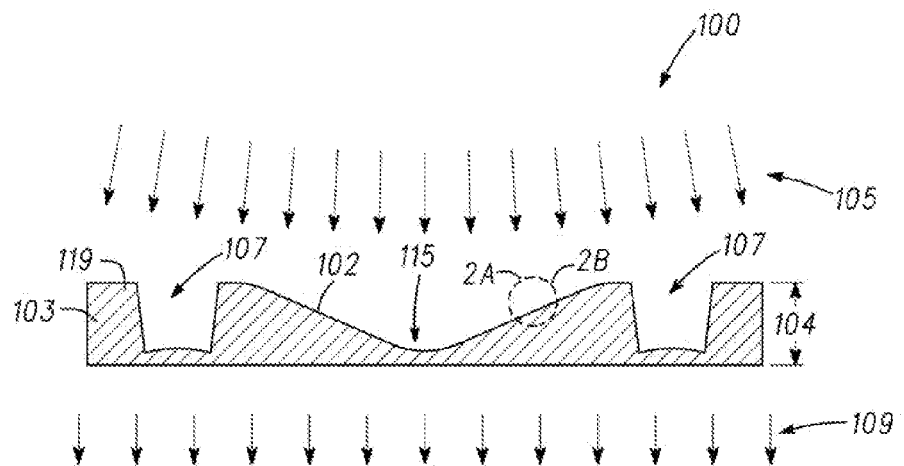
FIG. 1 is a cross-sectional view of an example grey-scale holographic structure in accordance with some embodiments.

FIG. 1 is a cross-sectional view of an example grey-scale holographic structure in accordance with some embodiments. The grey-scale holographic structure 100 comprises a millimeter-wave transmissive material 103 and has a surface 102 that is arranged to provide differing amounts of phase-delay to an incident millimeter-wave wavefront 105 as the incident wavefront 105 passes through the material 103. In some embodiments, the grey-scale holographic structure 100 may be a multi-layer structure comprising a plurality of layers 104 for an integer multiple of quarter-wavelengths. Each layer 104 may have a differing thickness and may provide a predetermined amount of phase delay.

In some of these embodiments, each layer 104 may correspond to a shade of grey which may be represented by values of a bitmap representing a grey-scale hologram. These embodiments are discussed in more detail below.

In some embodiments, each of the multiple layers 104 may be selected to provide a phase total delay of lambda to result from a number (N) of layers 104 in which each layer 104 has a thickness of a wavelength/N. In some example embodiments, the number of layers 104 (N) of the grey-scale holographic structure 100 may range from one to two-hundred and fifty-five and may have a corresponding effect of one wavelength to a two-hundred and fifty-fifth of a wavelength (i.e., for the different thickness of the structure 100). In some embodiments, each layer 104 may be selected to provide a phase total delay of lambda from N number of tuned layers 104, each having a thickness of the wavelength/N. In these embodiments, the phase total delay results from this series of tuned layers 104.

In these embodiments, a wavelength may refer to a wavelength of the frequency of the incident wavefront 105. Lambda (λ) may refer to wavelength(s), in which:

$$E = h\nu, \lambda = \frac{c}{\nu},$$

where: E is the energy of photon, h is Planck's constant, ν is the frequency of a photon, and c is the speed of light.

In some embodiments, the layers 104 of the surface 102 may be designed and configured to modify characteristics of the incident wavefront 105 via the diffractive-wave properties tuned within the material 103 when transmissing through the material 103 to generate an output wavefront 109 having predetermined characteristics. In these embodiments, the grey-scale holographic structure 100 may operate as a phase-delay hologram using the various phase delays that occur as the wavefront 105 travels through the material 103. In these embodiments, more phase delay occurs in thicker portions of the structure 100 and less phase delay occurs in thinner portions of the structure 100. Accordingly, the thickness of the material 103 at any given point provides a certain phase delay. In some embodiments, the surface 102 is arranged to provide varying amounts of phase-delay. This is unlike conventional amplitude holograms which use the amplitude of an incident wave and rely on reflective zones and transmissive zones. Reflective zones reflect most or all of the energy incident on a reflective zone without a phase delay. Transmissive zones pass most or all of the energy incident on a transmissive zone without a phase delay.

Although embodiments disclosed herein relate to millimeter-waves, the scope of the present invention is not limited in this respect. Embodiments may also be applicable to almost any electromagnetic wave including Ka band radio-frequency (RF) waves, as well as optical wavelength waves including infrared (IR) waves.

Figure 2A:
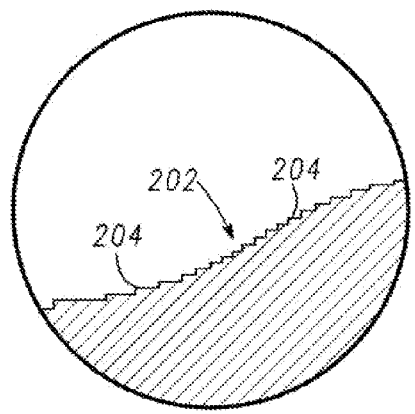
FIG. 2A illustrates stepped-surface embodiments of a grey-scale holographic structure in accordance with some embodiments.

FIG. 2A illustrates stepped-surface embodiments of a grey-scale holographic structure 100 (FIG. 1) in accordance with some embodiments. In these embodiments, the layers 204 of the surface 202 are stepped and each layer 204 may comprise a surface region and be associated with a distance thorough the material 103 (FIG. 1) (e.g., a thickness). In this example, layers 204 may correspond to layers 104 (FIG. 1) and surface 202 may correspond to surface 102 (FIG. 1) of grey-scale holographic structure 100 (FIG. 1).

In these embodiments, each layer 204 may be a substantially flat surface region that may be provided normal to the incident wavefront 105 (FIG. 1), although this is not a requirement. Each layer 204 may be associated with a different thickness of material 103 providing an associated predetermined phase delay. In these embodiments, the width of each step may be on the order of 0.001 inches and the height of each step may be the wavelength/N. In some embodiments, each layer 204 may be selected to provide a phase total delay of lambda from N number of layers 204, each with a thickness of a wavelength/N.

Figure 2B:
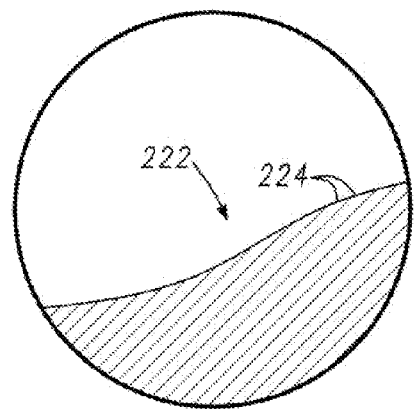
FIG. 2B illustrates smooth-surface embodiments of a grey-scale holographic structure in accordance with some embodiments.

FIG. 2B illustrates smooth-surface embodiments of a grey-scale holographic structure 100 (FIG. 1) in accordance with some embodiments. In these embodiments, the layers 224 of the surface 222 are smooth to provide a curved surface. In this example, layers 224 may correspond to layers 104 (FIG. 1) and surface 222 may correspond to surface 102 (FIG. 1) of grey-scale holographic structure 100 (FIG. 1). In these alternate embodiments, rather than stepped layers 204, a smooth surface 222 is provided. Each layer 224 may be curved and may be associated with a different thickness of material 103 (FIG. 1) providing an associated predetermined phase delay.

The grey-scale holographic structure 100 may be fabricated by a three-dimensional (3D) fabrication process. In some embodiments, the surface 102 may be fabricated by machining a block of the millimeter-wave transmissive material 103 with a digitally controlled lathe or milling machine based on a bitmap. Machining may be used to fabricate both the stepped-surface embodiments illustrated in FIG. 2A and the smooth-surface embodiments illustrated in FIG. 2B. The generation of the bitmap is discussed in more detail below.

In other embodiments, the surface 102 may be fabricated using a 3D stereo-lithographic process including micro-lithography. 3D stereo-lithography may be used to fabricate both the stepped-surface embodiments illustrated in FIG. 2A and the smooth-surface embodiments illustrated in FIG. 2B. Other fabrication techniques may be used that are suitable for providing feature sizes ranging from about one to five thousandths of an inch.

In some embodiments, the number of layers 104 (N) may be at least ten per each lambda. In some embodiments, the number of layers 104 of the grey-scale holographic structure 100 may be as few as two to as great as 256 or more. In some embodiments, at least ten layers 104 are used. In other embodiments, at least one-hundred layers 104 are used. The limitation on the maximum number of layers 104 (per wavelength) may be based on the wavelength, selected phase delay integer, the material index of refraction, and precision ability to manufacturing the phase steps. The selected phase delay integer may be the number of levels per lambda.

In some embodiments, the grey-scale holographic structure 100 may operate as a grey-scale hologram or as a diffractive optical element (DOE) at millimeter-wave frequencies. In some embodiments, the grey-scale holographic structure 100 may be a computer-generated hologram (CGH).

In some embodiments, the total optical path difference (OPD) may be calculated from the following equation:

$$\text{TotalOPD} = \lambda = \left(\frac{\lambda}{N_s - N_a}\right) = \text{depth\_of\_pattern}$$

$\lambda$=Wavelength of electromagnetic wave to be effected,
Ns=Index of substrate material 103.
Na=Index of material outside substrate (e.g., vacuum=1).
In these embodiments, the phase per step may be calculated as follows, where each layer corresponds to one step:

$$\text{Phase\_per\_step} = \frac{\text{TotalOPD}}{\text{\# of\_Steps}} \text{(Typically \# of steps is between 0-256)}$$

In some embodiments, the ideal non-quantized OPD for holographic optical elements (HOE) in transmission using single-harmonic modulus may be represented as $\lambda$, the ideal non-quantized depth in material 103 may be represented as d=$\lambda$/(Ns−Na). The quantized depth per step may be represented as d/q=$\lambda$/(q*(Ns−Na)), where q may be the number of quantization levels (steps) and may be between 2 and 256, and the OPD per step may be represented as $\lambda$/q. The phase per step may be represented as d*(Ns−Na)*2*pi/$\lambda$=2*pi/q.

In some embodiments, the millimeter-wave transmissive material 103 may be transmissive at one or more predetermined millimeter-wave frequencies ranging from 26 GHz or less to up to 300 GHz or greater. In these embodiments, the millimeter-wave frequencies may have a wavelength between less than 0.7 millimeters and up to 10 or more millimeters. In some embodiments, the millimeter-wave transmissive material 103 may comprise a synthetic fluoropolymer of tetrafluoroethylene, such as Polytetrafluoroethylene (PTFE) or Teflon, although other millimeter-wave transmissive materials that provide a phase-delay in proportion to their thickness such as nylon, Rexolite, and Polystyrene may be used.

In some embodiments, the incident millimeter-wave wavefront 105 may be a curved wavefront having some non-uniform amplitude characteristics. The predetermined characteristics of the output wavefront 109 may include substantially uniform amplitude characteristics defining a flat-field wavefront. In some embodiments, the incident wavefront 105 with non-uniform amplitude characteristics may be a curved wavefront or a substantially spherical wavefront with at least some amplitude and phase distortion (i.e., a non-ideal curved or spherical wavefront), such as a wavefront generated by an actual horn antenna, although this is not a requirement. In these embodiments, the grey-scale holographic structure 100 may be designed to compensate for the non-ideal characteristics of the incident wavefront 105 to generate an output wavefront 109 that is more ideal (e.g., a planar or collimated wavefront that is substantially uniform in amplitude, such as a flat-field wavefront). In some embodiments, the predetermined characteristics of the output wavefront 109 may also include phase coherency in the far field, although this is not a requirement.

Figure 3:
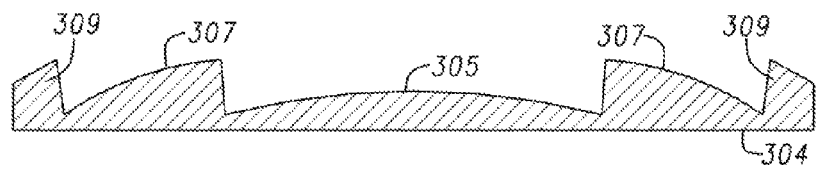
FIG. 3 is a cross-sectional view of an example grey-scale holographic structure in accordance with some other embodiments.

FIG. 3 is a cross-sectional view of an example grey-scale holographic structure in accordance with some other embodiments. The grey-scale holographic structure 304 may operate similar to the grey-scale holographic structure 100 (FIG. 1) but may be designed to operate on an incident wavefront having certain predetermined characteristics and generate an output wavefront have certain predetermined characteristics.

In some embodiments, the surface of the grey-scale holographic structure 304 may have a concave central region 305 with a gradually changing depth and an outwardly curved outer region 307 with a gradually changing depth and a large step in between. In some of these embodiments, the surface 102 (FIG. 1) of the grey-scale holographic structure 100 (FIG. 1) may have a convex central region 115 (FIG. 1) with a gradually changing depth and an outer channel 107 (FIG. 1) with steep sides, although the scope of the embodiments is not limited in this respect.

In these embodiments, the grey-scale holographic structure 100 may also include edge region 119 (FIG. 1). The grey-scale holographic structure 304 may include edge region 309 as illustrated, although the scope of the embodiments is not limited in this respect as the illustrated shapes of grey-scale holographic structures 100 and 304 are configured to operate together to convert an incident wavefront generated by a horn antenna to a collimated wavefront.

Figure 4A:
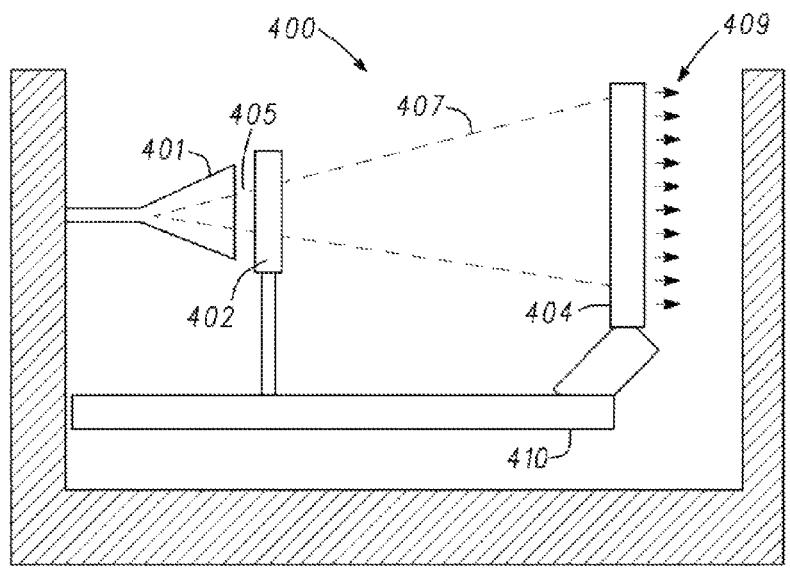
FIG. 4A illustrates a millimeter-wave collimator system in accordance with some embodiments.

FIG. 4A illustrates a millimeter-wave collimator system in accordance with some embodiments. The millimeter-wave collimator system 400 may generate a flat field collimated wavefront and may be suitable for use in a compact range. The millimeter-wave collimator system 400 may include a directional antenna 401 to generate an incident millimeter-wave wavefront 405 having non-uniform amplitude characteristics, and one or more grey-scale holographic structures (e.g., 402, 404) to operate on the incident millimeter-wave wavefront 405 to provide an output wavefront 409 that has predetermined characteristics. In some embodiments, the output wavefront 409 may have substantially uniform amplitude characteristics. In these embodiments, each grey-scale holographic structure may comprise millimeter-wave transmissive material having a surface arranged to provide differing amounts of phase-delay to the incident millimeter-wave wavefront 405 as the incident wavefront 405 passes through the material. The surface of the one or more grey-scale holographic structures may comprise a plurality of layers for a wavelength phase delay. Each layer may provide a predetermined amount of phase delay.

In some embodiments, the millimeter-wave collimator system 400 may include a single grey-scale holographic structure while other embodiments, the millimeter-wave collimator system 400 may include two or more grey-scale holographic structures. In one example embodiment, the grey-scale holographic structure 100 (FIG. 1) may be used for the first grey-scale holographic structure 402 and the grey-scale holographic structure 304 (FIG. 3) may be used for the second grey-scale holographic structure 404, although the scope of the embodiments is not limited in this respect.

In some embodiments, the first grey-scale holographic structure 402 may provide initial corrections to the incident millimeter-wave wavefront 405 via phase delays and provide a secondary millimeter-wave wavefront 407. The second grey-scale holographic structure 404 may provide additional corrections to the incident millimeter-wave wavefront 405 via phase delays (and may operate on the secondary millimeter-wave wavefront 407) to generate the output wavefront 409. In some embodiments, the first grey-scale holographic structure 402 may be designed as a beam expander to spread out the incident wavefront 405 and correct for at least some amplitude distortion of the incident wavefront 405. The second grey-scale holographic structure 404 may be designed to collect and focus the secondary millimeter-wave wavefront 407 to provide a collimated or flat-field wavefront that has substantially uniform amplitude characteristics.

A collimated wavefront may refer to a non-expanding wavefront having components that are substantially parallel and substantially uniform in amplitude. In some embodiments, at least one of the first grey-scale holographic structure 402 and the second grey-scale holographic structure 404 may also correct for at least some phase errors in the incident wavefront 405 to provide an output wavefront 409 that is substantially coherent in phase, although the scope of the embodiments is not limited in this respect. In embodiments that use two or more grey-scale holographic structures, the two or more grey-scale holographic structures may be designed to work together to collimate and correct for distortion in a curved incident wavefront 405 to provide an output wavefront 409 that has substantially uniform amplitude characteristics.

In some embodiments, the millimeter-wave collimator system 400 may also include a support structure 410 to support each of the grey-scale holographic structures within a chamber, although the scope of the embodiments is not limited in this respect.

In some embodiments, the millimeter-wave collimator system 400 may generate a flat field millimeter-wave collimated wavefront in a compact range. In some example embodiments of a millimeter-wave collimator system that operates around 26 GHz, the distance from the directional antenna 401 to the first grey-scale holographic structure 402 may range from 100 mm to 200 mm. The distance from the first grey-scale holographic structure 402 to the second grey-scale holographic structure 404 may range from about 400 mm to 600 mm. This is unlike conventional ranges that may require distances of up to eight meters or more. Accordingly, more than a ten-times (10×) or greater reduction in range size may be achieved. In this example embodiment, the first grey-scale holographic structure 402 may have a radius ranging from approximately 200 mm to 220 mm and the second grey-scale holographic structure 404 may have a radius ranging from approximately 250 mm to 300 mm, although the scope of the embodiments is not limited in his respect. The thickness of the first and second grey-scale holographic structures may range from 15-30 mm for quarter-wavelength embodiments. Some embodiments may have a thickness up to 100 mm or more.

Figure 4B:
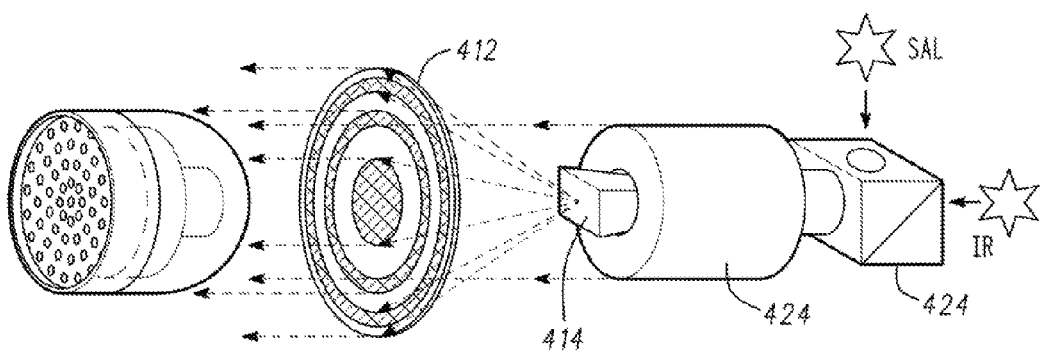
FIG. 4B illustrates a tri-mode seeker simulator in accordance with some embodiments.
Figure 4C:
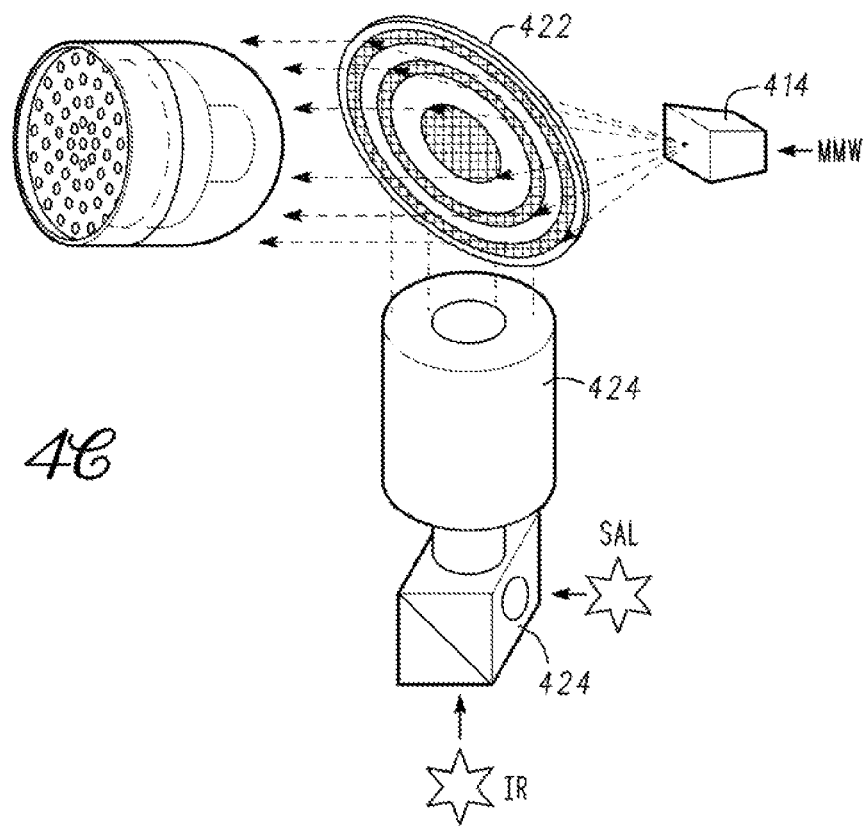
FIG. 4C illustrates a tri-mode seeker simulator in accordance with some other embodiments.

In some embodiments, the millimeter-wave collimator system 400 may be part of a tri-mode seeker simulator that simulates three radiating sources. FIG. 4B illustrates a tri-mode seeker simulator in accordance with some embodiments. FIG. 4C illustrates a tri-mode seeker simulator in accordance with some other embodiments. In these embodiments, the tri-mode seeker simulator may simulate laser wavelengths (e.g., between 1000 and 2000 nm) for a semi-active laser (SAL), long-wave infrared (LWIR) ranging between 8 and 12 um), and millimeter waves as discussed above. In these embodiments, the three radiating sources may be co-aligned to produce a tri-mode collimated beam.

In FIG. 4B, a CGH 412 comprising a millimeter-wave transmissive material, such as millimeter-wave transmissive material 103 (FIG. 1), is provided with transmissive zones. The SAL and infrared (IR) wavelengths to pass through the millimeter waves are collimated to generate a flat field millimeter-wave that is co-aligned with the SAL and IR wavelengths to create a tri-mode collimated beam.

In FIG. 4C, a CGH 422 comprising a millimeter-wave transmissive material, such as millimeter-wave transmissive material 103, is provided with reflective zones to reflect the SAL and IR wavelengths while collimating the millimeter waves to generate a flat field millimeter-wave that is co-aligned with the SAL and IR wavelengths to create a tri-mode collimated beam.

In these tri-mode seeker simulator embodiments, optical elements 424 may be configured to combine SAL wavelengths and IR wavelengths for incident on the CGH 412, 422, and a directional antenna 414 to generate an incident millimeter-wave wavefront having non-uniform amplitude characteristics for incident on the CGH. The CGH 412, 422 may be a grey-scale holographic structure to operate on the incident millimeter-wave wavefront to provide a flat-field millimeter-wave front that has substantially uniform amplitude characteristics. The flat-field millimeter-wave front may be co-aligned with the SAL and IR wavelengths to create a tri-mode collimated beam. The millimeter-wave transmissive material may have a surface arranged to provide differing amounts of phase-delay to an incident millimeter-wave wavefront as the incident wavefront passes through the material. The surface may comprise a plurality of layers for an integer multiple of quarter-wavelengths, each layer providing a predetermined phase delay. Each layer may be selected to provide a phase total delay of lambda to result from a number (N) of layers. Each layer may have a thickness of a wavelength/N.

Figure 5A:
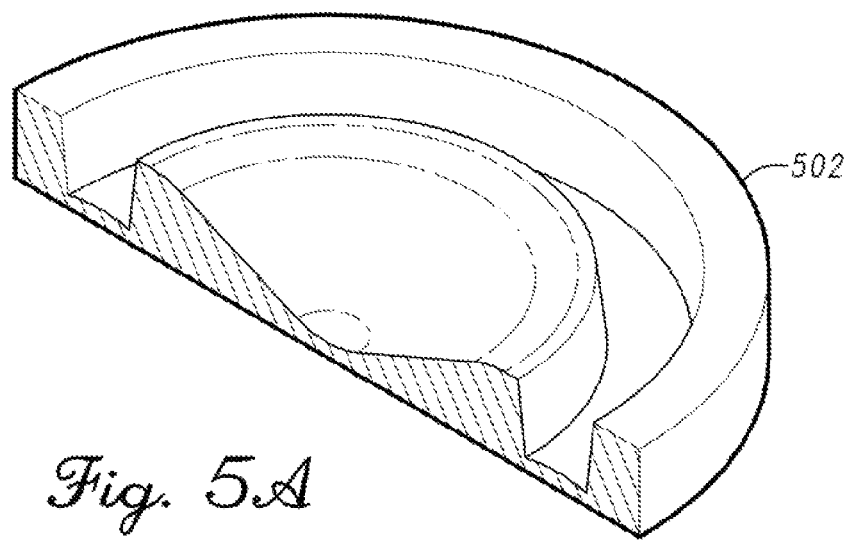
FIG. 5A illustrates a three-dimensional cross-section view of the grey-scale holographic structure of FIG. 1.

FIG. 5A illustrates a three-dimensional cross-section view of the grey-scale holographic structure of FIG. 1. The grey-scale holographic structure 502 may correspond to grey-scale holographic structure 100 (FIG. 1) and may be suitable for use as grey-scale holographic structure 402 (FIG. 4A), although the scope of the embodiments is not limited in this respect.

Figure 5B:
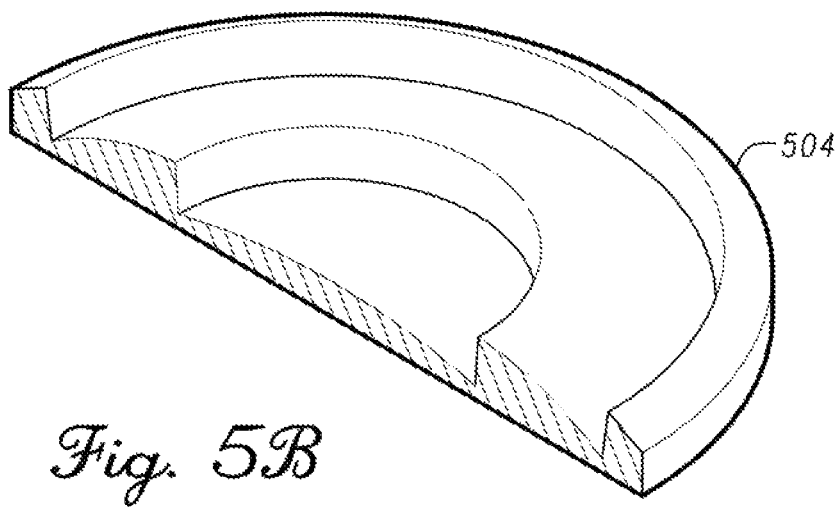
FIG. 5B illustrates a three-dimensional cross-section view of the grey-scale holographic structure of FIG. 3.

FIG. 5B illustrates a three-dimensional cross-section view of the grey-scale holographic structure of FIG. 3. The grey-scale holographic structure 504 may correspond to grey-scale holographic structure 304 (FIG. 3) and may be suitable for use as grey-scale holographic structure 404 (FIG. 4A), although the scope of the embodiments is not limited in this respect.

Either grey-scale holographic structure 502 (FIG. 5A) or the grey-scale holographic structure 504 (FIG. 5B) may be suitable for use as the CGH of the tri-mode seeker simulators illustrated in FIGS. 4B and 4C.

Figure 6:
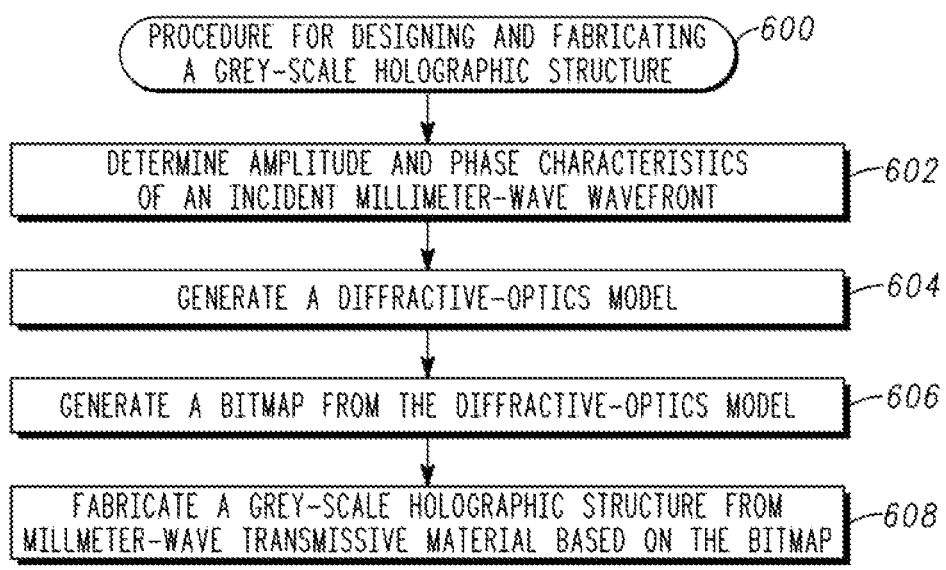
FIG. 6 is a procedure for designing a grey-scale holographic structure in accordance with some embodiments.

FIG. 6 is a procedure for designing a grey-scale holographic structure in accordance with some embodiments. Procedure 600 may be suitable for use to design and fabricate a grey-scale holographic structure, such as the grey-scale holographic structure 502 (FIG. 5A) or the grey-scale holographic structure 504 (FIG. 5B).

Operation 602 comprises determining amplitude and phase characteristics of an incident millimeter-wave wavefront, such as incident millimeter-wave wavefront 105 (FIG. 1).

Operation 604 comprises generating a diffractive-optics model to convert the incident millimeter-wave wavefront based on the amplitude and phase characteristics to an output wavefront having predetermined characteristics. The diffractive-optics model may comprise one or more computer-generated holograms (CGHs) each indicating an amount of phase delay and/or phase correction at each location across the surface of the CGH.

Operation 606 comprises generating a bitmap from the diffractive-optics model. The bitmap may comprise a plurality of values and each value may represent an amount of phase delay that is associated with a layer height or material thickness. In these embodiments, the bitmap may represent a grey-scale hologram.

Operation 608 comprises fabricating a grey-scale holographic structure from millimeter-wave transmissive material based on the bitmap using a three-dimensional fabrication process. The holographic structure comprises a plurality of layers having layer heights based on values of the bitmap.

In accordance with embodiments, each layer may be selected to provide a phase total delay of lambda from N number of layers, each with a thickness of a wavelength/N. A wavelength may refer to a wavelength of the frequency of the incident wavefront.

In these embodiments, the bitmap may represent a three-dimensional model of a grey-scale hologram or holographic structure in which each element of the bitmap represents an x-y position and the value of each element represents a layer height or material thickness. The values may depend on the number of layers selected.

In some embodiments, the predetermined characteristics of the output wavefront may comprise substantially uniform amplitude characteristics defining a flat-field or a collimated wavefront. In some embodiments, the incident wavefront may be a curved wavefront having non-uniform amplitude characteristics with at least some amplitude and/or phase distortion. The diffractive-optics model generated in operation 604 may compensate, at least in part, for the amplitude and phase distortion.

In some embodiments, the amplitude and phase characteristics may be determined in operation 602 by measuring the incident millimeter-wave wavefront generated by a directional antenna at each of a plurality of x-y positions. In some embodiments, the amplitude and phase characteristics may be measured in the far-field of the antenna, although this is not a requirement. In some embodiments, a horn-antenna may be used to generate the incident millimeter-wave wavefront, although other directional antennas may be used. In some embodiments, the amplitude and phase characteristics may be determined by modeling the incident millimeter-wave wavefront generated by a directional antenna.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of designing and fabricating a grey-scale holographic structure comprising:
   generating a diffractive-optics model to convert an incident millimeter-wave wavefront based on amplitude and phase characteristics to an output wavefront having predetermined characteristics, the diffractive-optics model comprising one or more computer generated holograms (CGHs) and indicating an amount of phase delay at each location across a surface of the CGH;

generating a bitmap from the diffractive-optics model, the bitmap comprising a plurality of values, each value representing an amount of phase delay that is associated with a layer height; and fabricating the grey-scale holographic structure from millimeter-wave transmissive material based on the bitmap using a three-dimensional fabrication process, the holographic structure comprising a plurality of layers having layer heights based on values of the bitmap.

2. The method of claim 1 wherein fabricating comprises fabricating with a digitally controlled lathe or milling machine based on the bitmap.

3. The method of claim 1 wherein fabricating comprises using a 3D stereo-lithographic process based on the bitmap.

4. The method of claim 1 wherein each layer is selected to provide a phase total delay of lambda to result from a number (N) of layers, each with a thickness of a wavelength/N, and wherein N ranges from ten to 256.

5. The method of claim 4 wherein the predetermined characteristics comprise substantially uniform amplitude characteristics defining a flat-field collimated wavefront, wherein the incident wavefront is a curved wavefront having non-uniform amplitude characteristics with amplitude and phase distortion, and wherein the diffractive-optics model is to compensate, at least in part, for the distortion.

6. The method of claim 5 wherein the amplitude and phase characteristics are determined by measuring the incident millimeter-wave wavefront generated by a directional antenna at each of a plurality of x-y positions.

7. The method of claim 5 wherein the amplitude and phase characteristics are determined by modeling the incident millimeter-wave wavefront generated by a directional antenna.

* * * * *